J. J. FAHRNEY.
VEHICLE WHEEL.
APPLICATION FILED OCT. 4, 1911.
1,087,224.
Patented Feb. 17, 1914.
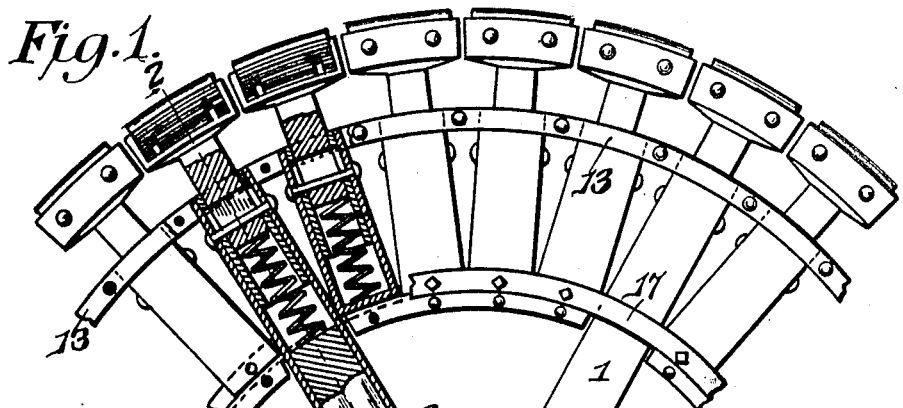
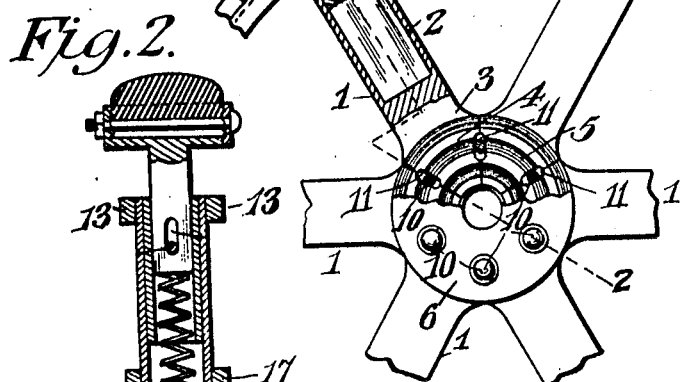
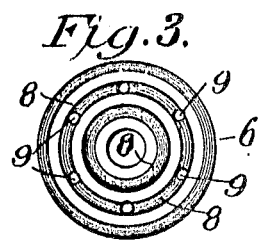
John J. Fahrney, Inventor
Witnesses
Jas. K. McCathran
F. G. Chapman
Attorney

UNITED STATES PATENT OFFICE.

JOHN J. FAHRNEY, OF TIMBERVILLE, VIRGINIA, ASSIGNOR OF ONE-THIRD TO JOHN P. BURKE, OF HARRISONBURG, VIRGINIA, AND ONE-SIXTH TO JOHN T. HELBERT AND ONE-SIXTH TO FRANK H. DRIVER, BOTH OF TIMBERVILLE, VIRGINIA.

VEHICLE-WHEEL.

1,087,224.      Specification of Letters Patent.      Patented Feb. 17, 1914.

Application filed October 4, 1911. Serial No. 652,873.

*To all whom it may concern:*

Be it known that I, JOHN J. FAHRNEY, a citizen of the United States, residing at Timberville, in the county of Rockingham and State of Virginia, have invented a new and useful Vehicle-Wheel, of which the following is a specification.

This invention has reference to improvements in vehicle wheels, and is designed to provide a means whereby the spokes may at all times be kept tightly lodged in the hub.

In accordance with the present invention there is provided a hub member and spokes so arranged that when the latter are placed in position in the hub they may be drawn forcibly inward toward the axis of rotation to stiffen the wheel and take up any looseness which may develop after the wheel has been in use for a time.

Moreover, a further purpose of the invention is to provide a simple form of wheel not liable to get out of order, but easily repaired when injured or worn, and which will be light but still strong enough to withstand all of the strains to which a vehicle wheel such as used upon an automobile may be called upon to withstand.

The invention will be best understood from a consideration of the following detailed description, taken in connection with the accompanying drawings forming a part of this specification, with the understanding, however, that while in the drawings there are shown practical embodiments of the invention, it is susceptible of other practical embodiments and therefore is not limited to any exact conformity with the structures therein shown.

In the drawings:—Figure 1 is an elevation with parts in section and broken away of a portion of a vehicle wheel constructed in accordance with the present invention. Fig. 2 is a section on the line 2—2 of Fig. 1. Fig. 3 is an inner face view of a hub section.

Referring to the drawings, there are shown spokes 1, each of which may be made of metal and is hollow for the greater portion of the length, as indicated at 2, while at the tenon end each spoke may be laterally extended, as indicated at 3, and then continued in segmental form, as indicated at 4, the segmental portion 4 having a series of ribs 5 on each side preferably of V-shape and described about a center substantially coincident with the center of the wheel when the parts are all assembled. The tenon portions of the spokes are confined between plates 6 of substantially annular form having their central portions extended axially to form hubs 7. That face of each plate 6 toward the tenon portions of the spokes is formed with circular grooves 8 of V-shape conforming to the ribs 5, while each plate 6 is also provided with passages 9 designed to be traversed by bolts 10.

When the wheel is assembled, the tenon or inner ends of the spokes are brought together, so that the corresponding ribs 5 are in substantially circular alinement and the meeting walls of the tenons are cut away in the form of elongated recesses 11 conforming substantially to the holes 9 and designed for the passage of the bolts 10.

When the meeting edges of the tenons of the spokes are brought together and the plates 6 are applied, the outstanding edges or crowns of the ribs 5 and the inset edges or valleys of the grooves 8 do not match, wherefore there is exerted upon the tenons a wedging action tending to move the spokes toward the axis of rotation of the wheel, but before the ribs 5 are fully seated in the grooves 8 the meeting edges of the spokes have been brought into contact and the parts are all firmly locked together, but should there develop any looseness of the parts the tightening of the bolts 10 will tend to bring the spokes all once more into firm engagement by the further movement of the ribs 5 into the grooves 8.

The outer ends of the spokes are connected to rings or bars 13, while at an intermediate point they pass through other rings or bars 17 so that when the hub is drawn together the indrawing tendency upon the spokes tends to stiffen the wheel by the resistance to this indrawing tendency offered by the rings or bars.

What is claimed is:—

1. In a wheel, a hub and spokes, the hub being formed of like members each provided with a plate portion extending radially of the corresponding ends of the spokes and being provided with a series of circular concentric grooves on the face toward the spokes, and the inner ends of the spokes being formed with a series of concentric circular ribs matching the grooves in the plates, the spokes at their inner ends being related one to the other to prevent complete seating of the ribs in the grooves when the plates are forced into embracing relation to the hub ends of the spokes.

2. In a wheel, a hub and spokes, the hub being formed of like members each provided with a plate portion extending radially of the corresponding ends of the spokes and being provided with a series of circular concentric grooves on the face toward the spokes, and the inner ends of the spokes being formed with a series of concentric circular ribs matching the grooves in the plates, the spokes at their inner ends being related one to the other to prevent complete seating of the ribs in the grooves when the plates are forced into embracing relation to the hub ends of the spokes, the spokes at their outer ends having connecting means extending between them and resistant to movements of the spokes toward the axis of rotation.

3. In a vehicle wheel, a series of spokes each having a tenon end of segmental form with opposite faces each provided with a series of concentric curved ribs, and hub plates applicable to opposite sides of the tenon ends of the spokes and each provided with a series of concentric curved grooves adapted to receive the ribs of the spokes when the wheel is assembled, the tenon ends of the spokes being shaped to engage at the meeting edges, while the ribs are but partially seated in the grooves.

4. In a vehicle wheel, a series of spokes each having the hub end provided on opposite faces with concentric curved ribs, and a hub member composed of plates each provided with a central hub portion and with concentric curved grooves in one face matching the ribs of the corresponding faces of the spokes, the ribs, grooves and corresponding ends of the spokes being related to prevent full seating of the ribs in the grooves when the spokes are brought into contact.

5. In a vehicle wheel, a series of spokes each having the hub end provided on opposite faces with concentric curved ribs, and a hub member composed of plates each provided with a central hub portion and with concentric curved grooves in one face matching the ribs of the corresponding faces of the spokes, the ribs, grooves and corresponding ends of the spokes being related to prevent full seating of the ribs in the grooves when the spokes are brought into contact, and the spokes at the meeting edges being provided with radially elongated matching recesses, and fastening devices extending through the hub members and through the matching portions of the recesses at the meeting edges of the spokes.

In testimony, that I claim the foregoing as my own, I have hereto affixed my signature in the presence of two witnesses.

JOHN J. FAHRNEY.

Witnesses:
WELTY B. FAHRNEY,
GEO. F. BULL.